United States Patent
De Brouwer et al.

(10) Patent No.: US 11,411,827 B2
(45) Date of Patent: Aug. 9, 2022

(54) COMPUTER NETWORK AND METHOD FOR RUNNING A COMPUTER NETWORK

(71) Applicant: Robert Bosch GmbH, Stuttgart (DE)

(72) Inventors: Tom De Brouwer, Breda (NL); Stephan Van Tienen, Bergen op Zoom (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/467,150

(22) PCT Filed: Dec. 9, 2016

(86) PCT No.: PCT/EP2016/080357
§ 371 (c)(1),
(2) Date: Jun. 6, 2019

(87) PCT Pub. No.: WO2018/103857
PCT Pub. Date: Jun. 14, 2018

(65) Prior Publication Data
US 2020/0076699 A1 Mar. 5, 2020

(51) Int. Cl.
*H04L 12/24* (2006.01)
*H04L 29/08* (2006.01)
(Continued)

(52) U.S. Cl.
CPC .......... *H04L 41/12* (2013.01); *H04L 43/0811* (2013.01); *H04L 69/324* (2013.01); *Y02D 30/00* (2018.01)

(58) Field of Classification Search
CPC ... H04L 41/12; H04L 69/324; H04L 43/0811; Y02D 30/00
See application file for complete search history.

(56) References Cited

U.S. PATENT DOCUMENTS 8,514,712 B1 * 8/2013 Aswadhati .......... H04L 41/0853
370/235
9,001,667 B1 * 4/2015 Khanna .................. H04L 43/08
370/245
(Continued)

FOREIGN PATENT DOCUMENTS

CN 102017652 A 4/2011
CN 104125154 A 10/2014
WO WO-2018100437 A1 * 6/2018

OTHER PUBLICATIONS

International Search Report for Application No. PCT/EP2016/080357 dated May 19, 2017 (2 pages).
(Continued)

*Primary Examiner* — Gary Mui
*Assistant Examiner* — Mohammed M Murshid
(74) *Attorney, Agent, or Firm* — Michael Best & Friedrich LLP

(57) ABSTRACT

Computer networks are widely used, whereby in a lot of networks audio and/or media devices are integrated. It is a Computer network 1 suggested, comprising a number of devices D. #1. #2 and at least one media node M1, M2, M3, M4, wherein each of the devices D. #1. #2 comprises at least one network port 2, wherein the devices D. #1. #2 are interconnected with the network by network links 3, each link connecting two respective network ports 2, wherein the network ports 2 are adopted to nm a physical network discovery protocol, wherein the media node M1, M2, M3, M4 comprises a media network port 5, wherein the media node M1, M2, M3, M4 is interconnected with one of the devices D. #1. #2 by the network links 3, wherein the network link 3 connects the media network port 5 and the network port 2 of the device D. #1. #2, wherein the media node M1, M2, M3, M4 is adopted to run a media station (Continued)

support communication protocol and to provide media node information.

15 Claims, 3 Drawing Sheets

(51) Int. Cl.
*H04L 12/26* (2006.01)
*H04L 41/12* (2022.01)
*H04L 69/324* (2022.01)
*H04L 43/0811* (2022.01)

(56) References Cited

U.S. PATENT DOCUMENTS

| | | | | |
|---|---|---|---|---|
| 9,917,845 B2* | 3/2018 | Wang | | H04L 47/286 |
| 2012/0092441 A1* | 4/2012 | Kong | | H04N 7/15 |
| | | | | 348/14.08 |
| 2012/0131157 A1* | 5/2012 | Gospodarek | | H04L 61/103 |
| | | | | 709/222 |
| 2012/0303789 A1* | 11/2012 | Bozionek | | H04L 41/12 |
| | | | | 709/223 |
| 2013/0272160 A1* | 10/2013 | Duggisetty | | H04L 61/103 |
| | | | | 370/254 |
| 2014/0372576 A1* | 12/2014 | Mohandas | | H04L 49/354 |
| | | | | 709/220 |
| 2015/0089038 A1* | 3/2015 | Gayles | | H04N 21/44222 |
| | | | | 709/223 |
| 2015/0319043 A1* | 11/2015 | Dibirdi | | H04L 41/12 |
| | | | | 370/254 |
| 2016/0028596 A1* | 1/2016 | Lund | | H04L 69/164 |
| | | | | 709/224 |

OTHER PUBLICATIONS

Ieee Computer Society Ieee Computer Society: "Station and Media Access Control Connectivity Discovery," Sep. 17, 2009, pp. 1-190, Retrieved from Internet <URL: http://ieeexplore.ieee.org/stampPDF/getPDF.jsp?tp=&arnumber=5251812>.

* cited by examiner

COMPUTER NETWORK AND METHOD FOR RUNNING A COMPUTER NETWORK

BACKGROUND OF THE INVENTION

The invention provides a computer network comprising a number of devices and at least one media node. Furthermore, the invention provides a method for running a computer network with a number of devices and at least one media node.

Computer networks are collections of computers and other components interconnected by communication channels. These channels allow for sharing of resources and information. Computer networks can be classified according to a variety of characteristics as the medium used, communication protocols, scale, topology and organization scope.

Ethernet networks are frame-based computer networks for local area networks. The performance of Ethernet networks is based on many different factors. An important factor is the physical layout of the computer network.

Especially in high performance low-latency Ethernet audio networks the physical network layout matters since this influences the ability to reliable synchronize audio clocks and delivery audio from end-point to end-point in time.

Layer 2 Ethernet protocols like "Link Layer Discovery Protocol" (LLDP) discover neighbors of any node in the network. Combining this information from different nodes and show the physical network topology, e.g. the physical network layout.

The document WO 2016/119846, which seems to be the closed state of the art, describes a method for running a computer network comprising a number of devices comprising at least one network port and being interconnected by network links connecting two respective ports, wherein each of the network ports is running the LLDP protocol and comprises a remote MIB, a change of a physical state of a network link triggers an update of the information in the remote MIB of the ports associated with this link, especially immediately after the change of the physical state.

SUMMARY OF THE INVENTION

According to the invention, a computer network comprising a number of devices and at least one media node is suggested. The invention also concerns a method for running a computer network. Preferred embodiments of the inventions result in the subclaims, the description and the figures.

The invention describes a computer network comprising a number of devices. For simplicity, the computer network may also be named network. The computer network is for example an Ethernet network. Preferably, the devices are computes, sensors, actors, server and/or printers.

The number devices in the network may comprises only devices of a same type or may be comprise devices of different type. Particularly, the network comprises more than 20 devices and preferably the network comprises more than 100 devices. Each of the devices comprise at least a network port. The network port may be a cable interface, e.g. a Ethernet port, a BNC connector or a fiber optic cable connector. Alternatively, the network port is a wireless interface, like a Bluetooth interface or infrared interface.

The devices are interconnected with the network by network links. Particularly, the interconnected devices form the computer network. The network links are especially cables, for example a twisted pair cable. The network links are operable as communication channels between the devices. The network links is especially a point-to-point connection. Alternatively, the network links are virtual network links, whereby the virtual network links are a wireless connection.

The network ports are adopted to run a physical network discovery protocol. Additionally and/or alternatively, the devices are adopted to run a physical network protocol. The physical network protocol is especially a point-to-point physical network protocol. The physical network protocol is based and/or operable to for crawling the computer network.

The network comprises a media node. Preferably, the network comprises more than 10 media nodes. A media node is for example an audio device or a video device, and especially an amplifier, a camera, a microphone, a pager and/or a display. The media node comprises at least one media network port. The media network port is particularly a direct network port. The media network port is for example a cable interface, e.g. a Ethernet port, a BNC connector or a fiber optic cable connector. Alternatively, the media network port is a wireless interface, like a Bluetooth interface or infrared interface.

The media node is interconnected with at least one of the devices by the network link, wherein the network link connects the media network port with a network port of one of the devices. Particularly, the media node is a media endpoint in the computer network, wherein an endpoint in the network is only connected with one of the devices. Advantage of the invention is to provide a fast network discovery and makes the network discovery less error-prone, by providing two protocols for discovering the network topology.

The media node and/or the media network port is operable to run a media station support communication protocol. The media node is adopted to provide media node information. Particularly, the media node information comprise information of the physical network layout and/or the network topology around and/or beginning at the media node.

In a preferred embodiment the invention, the media station support communication protocol is based and/or operable for physical network discovery. Physical network discovery is in particular for discovering the layout of the computer network. Particularly, the layout of the computer network is also referred as the computer network topology, whereby the network topology is the arrangement of the devices and media nodes of the. The network topology especially comprises a physical topology, whereby the physical topology is the placement of the devices of the network, including device location and network link installation. The network topology may also comprise a whereby the logical topology illustrates how data flows within a network, regardless of its physical design. Preferably, a media station support communication protocol running on a media node is operable for crawling the network beginning at the media node where it is running.

Advantage of the invention is, that network discovery can be started from a device of the computer network, whereby the network can be discovered by crawling the network beginning at the device. In parallel the service discovery protocol can be started to discover any media node. Once found a media node, the media node can be used to do network discovery as well via the media station support communication protocol. Due to the combination of the both protocols and/or the parallel network discovery a much faster network discovery is possible.

Particularly, at least one of the devices and/or network port of the devices is adopted to run a service discovery protocol, wherein also at least one media node and/or one media network port is adopted to run the service discovery protocol, wherein the service discovery protocol is operable that the devices can find a media node.

In a preferred embodiment of the invention, the physical network discovery protocol is the Link-Layer Discovery protocol, also called LLDP. The Link-Layer Discovery protocol is especially the Link-Layer Discovery protocol 802.1AB. Particularly, the physical network is a layer 2 Ethernet protocol. The physical network discovery protocol is operable to discover neighbors of any node in the computer network. Combining this information from different nodes can identify the physical network topology. In particular, the Link-Layer Discovery protocol is a vendor neutral network protocol that allows nodes attached to an IEEE 802 LAN to advertise, to other nodes attached to the same IEEE 802 LAN, its presence and major capabilities. A node is for example the network port of a device. Preferably, LLDP defines a protocol and management elements, suitable for advertising information to stations attached to the same IEEE 802 LAN and for learning information of stations attached to the same IEEE 802 LAN.

In a preferred embodiment of the invention, the number of devices comprise a first device. The first device is preferably adapted for being used by a user. The first device is for example a computer and/or the administration station of the network. The first device is operable to start and/or to do network discovery, wherein the network discovery starts and/or begins at the first device and/or is looking for the devices next to the first device. The first device is preferably operable to operate and/or to run the physical network discovery protocol for the network discovery.

Preferably, the first device is operable to crawl the computer network to find and/or discover the network layout and/or network topology, especially with the first device as a starting point. In particular, the first device is operable to search, find and/or connect to at least one of the media nodes. Especially, the first device is operable to run the service discovery protocol for searching, finding and/or connecting to at least one of the media nodes. In particular, the service discovery protocol is operable to start the media station support communication protocol. In particular, the first device is operable to receive media node information from the media. It is a consideration of the embodiment for getting a robust computer network, to use another protocol for finding and connecting to the media node than the physical network discovery protocol.

Preferably, the media node information comprise information about the network topology around the related media node. The network topology around the related media node is in particular the physical and/or logical network layout around and/or next to the related media node, for example the devices directly connected to the media node, the devices connected to the directly connected device and so on.

In a preferred embodiment of the invention, the first device is operable to use the media node information to discover the topology of the computer network. Especially the first device is operable to complete and/or supplement the network topology, found using the physical network discovery protocol, by using the media node information. Alternatively and/or additionally, the first device is operable to check and/or verify the network topology, found using the physical network discovery protocol.

A possible embodiment suggests, that the number of devices comprise a faulty device. The faulty device is for example a device of the number of devices which is not running the physical network discovery protocol. Especially the faulty device is a device of the number of devices which is unable to discover and/or report the network topology around and/or is not able to connect to another device via the physical network discovery protocol. For example, the faulty device is like a gap in the network link for using the network discovery protocol. In particular, the first device is operable to use the media node to discover the topology of the computer network and/or to bypass the faulty device.

In a preferred embodiment, the faulty device is one of the number of devices, whereby the device is not operable to announce its management address, whereby, the first device is operable to use the media node information to discover the topology of the computer network and/or to bypass the faulty device.

It is an idea of the invention, to bypass a faulty device, especially by approaching a computer network form more than one side, e.g. the first device and the media nodes. Therefor it does not matter that one device is faulty and/or not running the physical network discovery protocol or does not announce its management address.

In a preferred embodiment of the invention, the first and/or a portion of the devices comprise a MIB. Alternatively and/or additionally the media node comprises a MIB. Preferably, an advertised and/or a learned information is stored in the MIB (Management Information Base). MIB Information could for example be read out by the physical network discovery protocol, for example the Simple Network Management Protocol (SNMP).

For example LLDP typically sends out a MAC service data unit (MSDU) with a Linker Layer Discovery Protocol data unit (LLDPDU) encapsulated every n seconds, e.g. n=30. This value is called message transmit interval (msgTxInterval).

In particular, LLDP defines different MIBs. For example a LLDP local system MIB includes the information needed to construct the LLDPDU messages that will be sent. Especially, a LLDP remote systems MIB stores information of each remote system that is detected. The LLDP remote systems MIB includes information from which local port the remote system information is received.

According to the invention, a method for running a computer network is suggested. The computer network is comprising a number of devices and at least one media node, wherein each of the devices comprises at least one network port, wherein the devices are interconnected with the network by network links, each link connecting two respective ports, wherein the network ports are running a physical network discovery protocol, wherein the media node comprises a media network port, wherein the media node is interconnected with one of the devices by a service network link, wherein the service network link connects the media network port and the network port of the device, whereby the media node is running a media station support communication protocol and is providing media node information. The computer network is preferably according to claims and/or the description.

The invention is based on following considerations:

According to the state of the art, LLDP information is retrieved from network stations, e.g. the devices of the computer network, by crawling the network. E.g. a user of the first device, will first discover station directly connected and/or linked to the first device, whereby this devices will discover the next devices. One-by-one each layer in the computer network will be discovered.

In state of the art networks the crawling network discovery can only continue if all devices report the appropriate neighbours with their management addresses on which to retrieve the MIB which includes the LLDP information. This process stops once the management address is not included in the advertisement.

The computer network may also be a media networks on which media nodes, such as, but not limited to, networked speakers, network break-out/break-in boxes and networked conference units co-exists with default network equipment.

Preferably, one of the requirements of the media nodes is the capability to announce their presence on the network, which makes them available for configuration by network stations. Any service discovery protocol is used for this. In particularly, the service discovery protocol do have the ability to simultaneous report a large number of devices presences on the network.

Especially, in case the combined network discovery is started, e.g. the physical network discovery protocol and the media station support communication protocol is running, the network layout will be much more complete due to the combination of the service discovery protocol, network discovery protocol and/or the media station support communication protocol. For example, a single node that does not announce its management address or does not expose its MIB information does not stop the discovery process.

DETAILED DESCRIPTION

Figure 1:
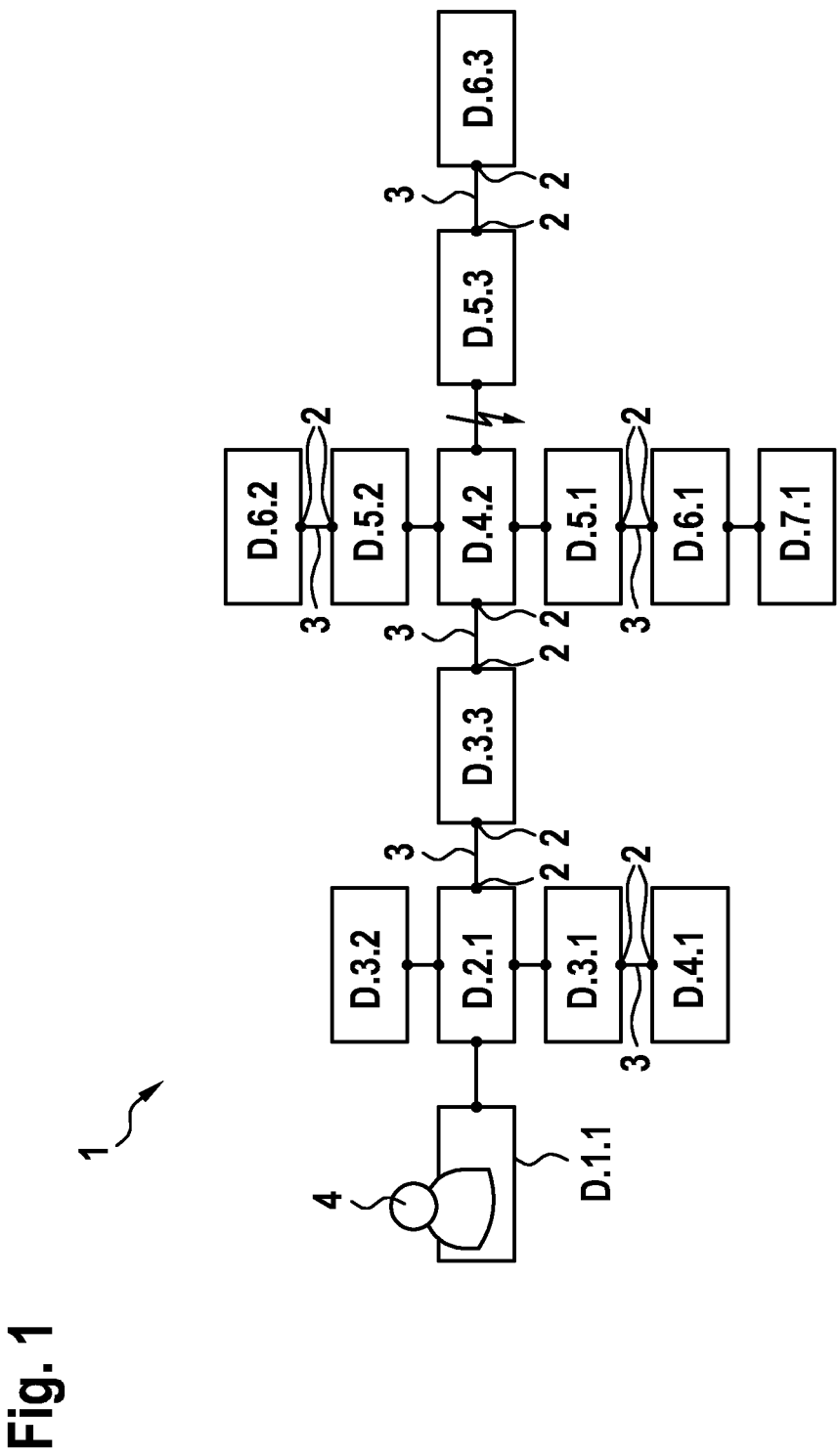
FIG. 1 a state of the art computer network.

FIG. 1 shows a computer network 1 like it is in the state of the art. The computer network comprises a number of devices D. #1. #2, whereby #1 indicates the hierarchy and #2 is a running index. Each of the devices D comprise at least one network port 2. The network ports 2 are for example a cable interface, a fiber optic cable interface or a wireless interface. The devices D are interconnected with network links 3, whereby the network links are for example cables. The network link interconnects two devices D, especially the network link 3 interconnects two network ports 2. The network ports 2 are running the LLDP for discovering the network topology. For a better overview only a few exemplary network ports 2 and network links 3 are indicated.

One of the number of devices is the first device D.1.1. The first device D.1.1 is adapted to be used by a user 4. The user 4 can operate and/or control the first device D.1.1. The first device D.1.1 is for example a computer, and especially the administration computer of the commuter network 1. The hierarchy is the number of devices D, that are between, especially connected between, the first device D.1.1 and the concerning device. E.g. a device D.2. #2 is a device D that is directly linked with the device D.1.1. A device D.3. #2 is a device that is connected to a device D.2. #2, whereby the device D.2. # is between D.1.1 and D.3. #2.

The user 4 is operable to crawl the computer network 1 by running the LLDP on the first device D.1.1. The first device D.1.1 will first discover the device D.2.1. Device D.2.1 will discover and report devices D.3.1, D.3.2 and D.3.3. The devices D.3.1, D.3.2 and D.3.3, will discover and report stations D.4.1 and D.4.2, the device D.4.2 will discover and report devices D.5.1, D.5.2 and D.5.3, et cetera. One-by-one each layer in the computer network 1 will be discovered. The information about the layer and/or the hierarchy of devices are part of the network topology.

The crawling and/or discovering of the computer network only discovers devices that are connected with the network link 3. If a link 3, a device D and/or a network port is not working correctly, this device D and following device will not be discovered by the first device D.1.1. For example the device D.5.3 is a faulty device, the device D.4.2 and the device D.5.3 are physically connected with a cable as network link, but the devices are not communicating using the LLDP. The device D.5.3 therefore cannot report its presence and can also not report the presence of the device D.6.3. Therefore also the first device cannot discover the network and/or network topology starting from D.5.3 towards D.6.3.

Figure 2:
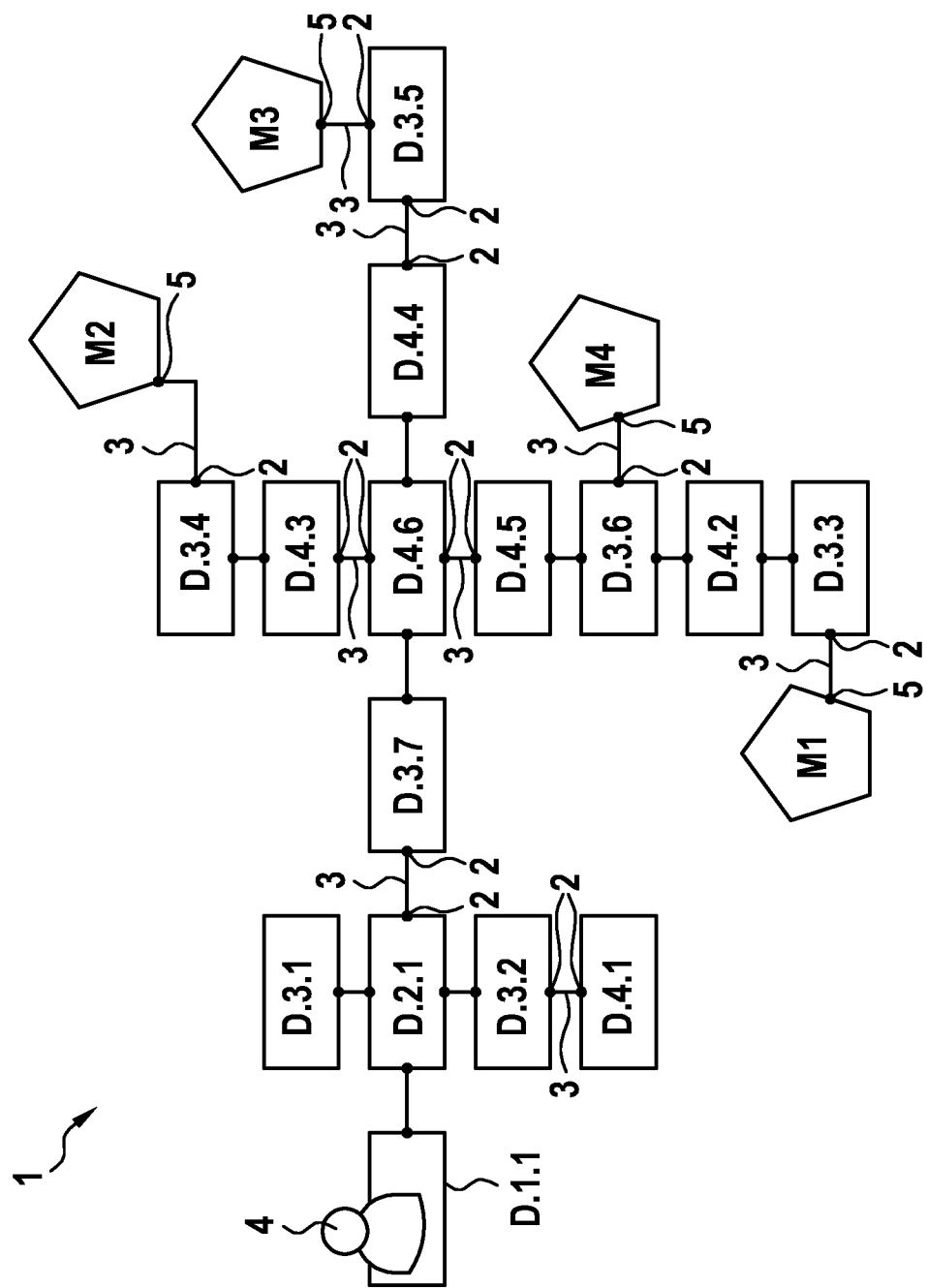
FIG. 2 an embodiment of the computer network.

FIG. 2 shows a computer network 1 as an embodiment of the invention. The computer network 1 comprises the same amount of devices D. #1.#2 as in FIG. 1. The devices D. #1. #2 comprise the first device D.1.1, whereby the first device is adopted to be used and/or controlled by the user 4. Each of the devices D. #1. #2 have at least one network port 3. The devices D. #1. #2 are interconnected with network links 3, whereby the devices D. #1. #2 are connected in the same way as in FIG. 1.

The computer network 1 comprise four media nodes M1, M2, M3 and M4. The media nodes M1, M2, M3 and M4 are for example conference units, e.g. with a microphone. Each media node comprise at least one media network port 5, whereby the media network port 5 may be the same type of port like the network port 3 of the devices D. #1. #2. Each media node M1, M2, M3 and M4 is interconnected with at least one device D. #1. #2, wherein the interconnection is preferably using the same network link, e.g. type of cable, as it is used for connecting the devices D. #1. #2.

The media nodes M1, M2, M3 and M4 are adopted to run the media station support communication protocol and/or the service discovery protocol. The service discovery protocol is adopted that the media node can announce its presence to the device D.1.1. The media station support communication protocol is operable to crawl the computer network 1 and to do network discovery around the media node M1, M2, M3, or M4. The media station support communication protocol is adopted to collect media node information and to offer the media node information to D.1.1., whereby the media node information comprises information about devices around and/or the network topology around the concerning media node M1, M2, M3 or M4. The media station support communication protocol and the service discovery protocol is adopted to share and/or provide the media node information to the first device D.1.1. The first device D.1.1 is adopted to use the media node information to complete the network topology and/or to crawl the computer network 1 faster.

The number of crawling steps, whereby the number of crawling steps is also reduced, especially it is only half the number due to the presence of the media nodes M1, M2, M3 and M4. In this consideration it is helpful to assume the M1 as a fictive device D.2.2, the M2 as D.2.3, the M3 as D.2.4 and the M4 as D.2.5. These fictive devices are crawling the network beginning at their position and announce the found device as or in the media node information. This assumes that all compatible devices announce their management address and expose their neighbor MIB.

Figure 3:
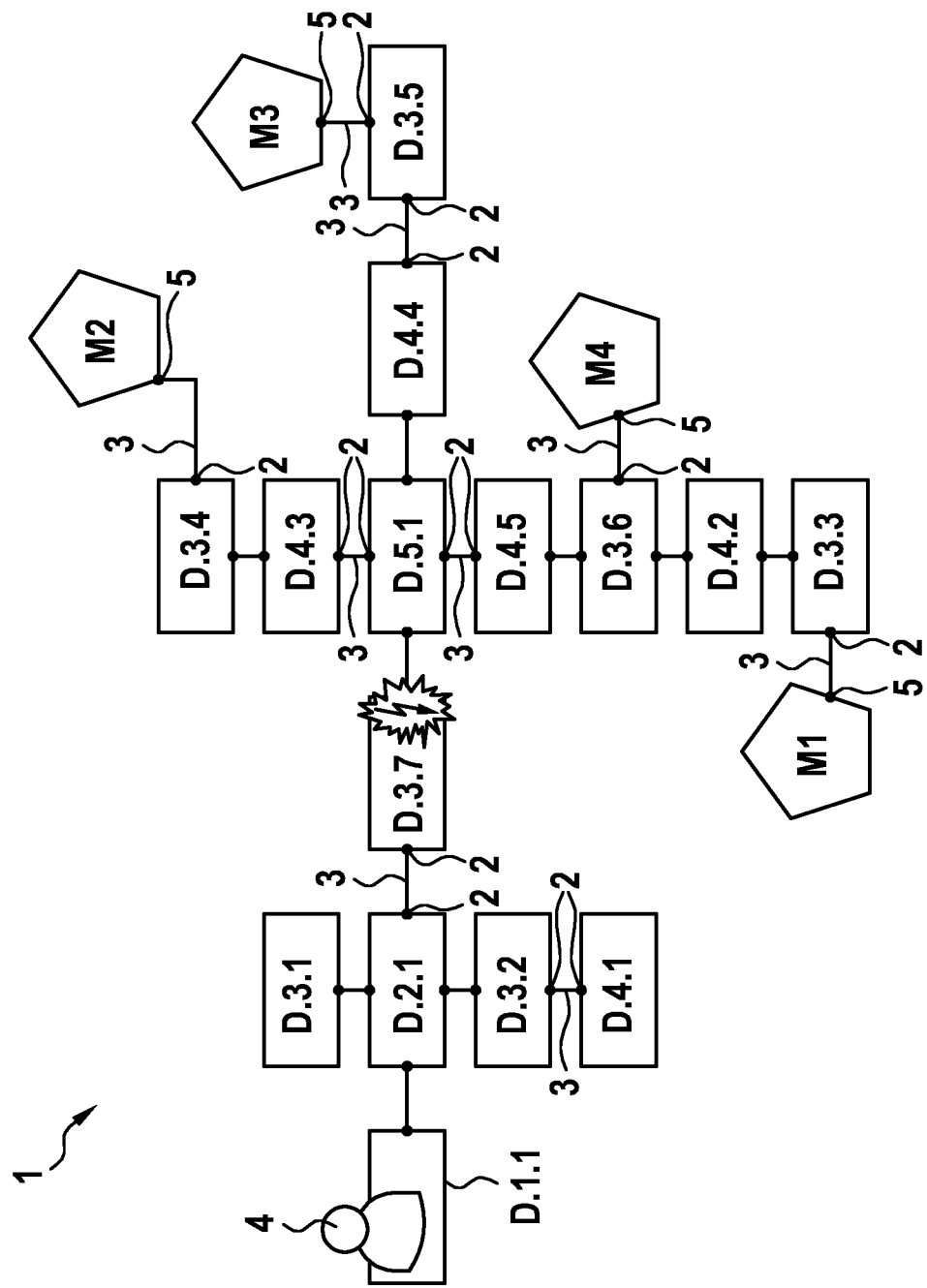
FIG. 3 the computer network with a faulty device.

FIG. 3 shows the computer network from FIG. 2, wherein the device D.3.7 does not support announcement of the neighbor MIB. Due to the media nodes M1, M2, M3, M4 and the media station discovery protocol the network topology can be completed and the gap at device D.3.7 can be bypassed. To complete network discovery some more crawling steps are additional, in this example one more crawling step is needed than in FIG. 2.

The invention claimed is:

1. A computer network comprising:
a plurality of devices including a first device, each of the plurality of devices including one or more network ports and configured to run a physical network discovery protocol, each of the plurality of devices being interconnected with the computer network via a plurality of network links each connecting two respective network ports of the plurality of devices; and
a media node including a media network port interconnected via one of the plurality of network links to one of the plurality of devices, the media node being configured to run a media station support communication protocol;
wherein the first device is configured to perform a network discovery according to the physical network discovery protocol to determine a topology of the computer network by crawling the computer network starting at the first device; and
wherein the media node is configured to simultaneously run the media station support communication protocol to provide media node information to the first device by crawling the computer network starting at the media node while the first device runs the physical network discovery protocol, the media node information including information about one or more of the plurality of devices that are around the media node, and
wherein the first device is configured to complete crawling the computer network from the media node and discover a faulty device within the computer network, the faulty device not running the physical network discovery protocol, that is undiscoverable by the first device during the network discovery according to the physical network discovery protocol, and complete the topology of the computer network including the faulty device based on the media node information sent to the first device from the media node according to the media station support communication protocol.

2. The computer network according to claim 1, wherein the media station support communication protocol is operable for the physical network discovery protocol.

3. The computer network according to claim 2, wherein the physical network discovery protocol is a Link-Layer Discovery protocol.

4. The computer network according to claim 1, wherein the first device of the plurality of devices is operable to find the media node via a service discovery protocol to find and connect to the media node and initiate the media station support communication protocol of the media node.

5. The computer network according to claim 1, wherein the faulty device is not operable to announce a management address of the faulty device.

6. The computer network according to claim 1, wherein at least one of the plurality of devices includes a management information base.

7. The computer network according to claim 1, wherein the media node is one selected from the group consisting of an audio device, a video device, a conference unit, and a microphone.

8. The computer network according to claim 1, wherein the media node is a video device.

9. The computer network according to claim 1, wherein the media node is a conference unit.

10. The computer network according to claim 1, wherein the media node is a microphone.

11. A method for running a computer network, the computer network including a plurality of devices including a first device, each of the plurality of devices include one or more network ports and are configured to run a physical network discovery protocol, each of the plurality of devices being interconnected with the computer network via a plurality of network links, each of the plurality of network links connecting two respective ports of the plurality of devices,
a media node including a media network port interconnected via one of the plurality of network links to one of the plurality of devices, the media node being configured to run a media station support communication protocol,
the method comprising:
performing, via the at least one the network port of the first device, a physical network discovery according to the physical network discovery protocol to determine a topology of the computer network by crawling the computer network starting at the first device, and
running, via the media node, the media station support communication protocol to provide media node information to the first device by crawling the network starting at the media node simultaneously while the first device runs the physical network discovery protocol, the media node information including information about one or more of the plurality of devices that are around the media node, and
wherein the first device is configured to continue complete crawling the computer network from the media node despite a faulty device within the computer network, the faulty device not running the physical network discovery protocol, that is undiscoverable by the first device during the network discovery according to the physical network discovery protocol, and complete the topology of the computer network including the faulty device based on the media node information sent to the first device from the media node according to the media station support communication protocol.

12. The method of claim 11, wherein the media node is an audio device.

13. The method of claim 11, wherein the media node is a video device.

14. The method of claim 11, wherein the media node is a conference unit.

15. The method of claim 11, wherein the media node is a microphone.

* * * * *